(12) United States Patent
Jurik et al.

(10) Patent No.: US 10,072,801 B2
(45) Date of Patent: Sep. 11, 2018

(54) COLLIMATION AND HOMOGENIZATION SYSTEM FOR AN LED LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 14/405,355

(22) PCT Filed: Jun. 3, 2013

(86) PCT No.: PCT/US2013/043950
§ 371 (c)(1),
(2) Date: Dec. 3, 2014

(87) PCT Pub. No.: WO2013/184600
PCT Pub. Date: Dec. 12, 2013

(65) Prior Publication Data
US 2016/0018064 A1   Jan. 21, 2016

Related U.S. Application Data

(60) Provisional application No. 61/654,929, filed on Jun. 3, 2012.

(51) Int. Cl.
*F21V 9/00*   (2018.01)
*F21K 99/00*   (2016.01)
(Continued)

(52) U.S. Cl.
CPC .............. *F21K 9/54* (2013.01); *F21K 9/62* (2016.08); *F21S 8/00* (2013.01); *F21V 5/008* (2013.01);
(Continued)

(58) Field of Classification Search
CPC ...... F21K 9/00; F21K 9/54; F21K 9/62; F21S 8/00; F21V 5/008; F21V 5/04; F21V 5/048; F21V 7/0091; G02B 19/0028
(Continued)

(56) References Cited

U.S. PATENT DOCUMENTS 6,200,002 B1 * 3/2001 Marshall ................. F21S 10/02
362/231
7,232,227 B2 * 6/2007 Yamasaki .............. G03B 37/04
348/750
(Continued)

FOREIGN PATENT DOCUMENTS

CN     1655052 A   8/2005
CN   102016402 A   4/2011
(Continued)

OTHER PUBLICATIONS

PCT International Search Report; Application No. PCT/US2013/043950; dated Nov. 5, 2013; 3 pages.
(Continued)

*Primary Examiner* — Bryon T Gyllstrom
(74) *Attorney, Agent, or Firm* — Conley Rose, P.C.; Grant Rodolph; Brooks W Taylor (57) ABSTRACT

Disclosed is an LED light source automated luminaire with a multi curved sided collimator mixer and integrator combination.

17 Claims, 9 Drawing Sheets

(51) Int. Cl.

| | |
|---|---|
| *F21S 8/00* | (2006.01) |
| *G02B 19/00* | (2006.01) |
| *F21V 5/00* | (2018.01) |
| *F21V 5/04* | (2006.01) |
| *F21V 13/04* | (2006.01) |
| *F21K 9/62* | (2016.01) |
| *F21V 7/00* | (2006.01) |
| *F21V 8/00* | (2006.01) |
| *F21Y 105/12* | (2016.01) |
| *F21Y 105/10* | (2016.01) |
| *F21Y 115/10* | (2016.01) |
| *F21Y 113/13* | (2016.01) |

(52) U.S. Cl.
CPC .............. *F21V 5/04* (2013.01); *F21V 5/048* (2013.01); *F21V 7/0091* (2013.01); *F21V 13/04* (2013.01); *G02B 19/0028* (2013.01); *F21V 7/0033* (2013.01); *F21Y 2105/10* (2016.08); *F21Y 2105/12* (2016.08); *F21Y 2113/13* (2016.08); *F21Y 2115/10* (2016.08); *G02B 6/0006* (2013.01); *G02B 6/0096* (2013.01)

(58) Field of Classification Search
USPC ........................................................ 362/231
See application file for complete search history.

(56) References Cited

U.S. PATENT DOCUMENTS

| | | | | |
|---|---|---|---|---|
| 7,237,929 B2 * | 7/2007 | Stahl | ...................... | G03B 21/00 362/241 |
| 7,484,850 B2 * | 2/2009 | Sakata | ................. | G03B 21/006 349/9 |
| 8,529,103 B2 * | 9/2013 | Tukker | ..................... | F21K 9/00 362/307 |
| 8,569,942 B2 * | 10/2013 | Kishimoto | ........... | F21S 48/1154 313/483 |
| 8,833,991 B2 * | 9/2014 | Kishimoto | ........... | F21S 48/1154 362/237 |
| 8,866,385 B2 * | 10/2014 | Kitagawa | ................ | F21K 9/135 313/318.01 |
| 9,291,314 B2 * | 3/2016 | Verbrugh | ................. | F21S 8/00 |
| 2007/0024971 A1 * | 2/2007 | Cassarly | ............. | G02B 6/0008 359/485.03 |
| 2009/0067179 A1 * | 3/2009 | Chaves | ..................... | F21K 9/00 362/329 |
| 2012/0307081 A1 * | 12/2012 | Dewald | ..................... | G01J 3/10 348/207.11 |
| 2013/0088471 A1 * | 4/2013 | Kitano | ................. | H04N 9/3114 345/208 |
| 2013/0155671 A1 * | 6/2013 | Kurt | .......................... | F21K 9/00 362/231 |
| 2013/0286359 A1 * | 10/2013 | Motoya | ................ | G03B 21/204 353/31 |
| 2015/0219314 A1 * | 8/2015 | Inoko | ...................... | F21V 13/14 362/84 |

FOREIGN PATENT DOCUMENTS

| | | | |
|---|---|---|---|
| CN | 102084177 | 6/2011 | |
| WO | 2010113091 A1 | 10/2010 | |
| WO | WO 2012004760 A1 * | 1/2012 | .............. F21V 5/008 |
| WO | 2012032455 A1 | 3/2012 | |

OTHER PUBLICATIONS

PCT Written Opinion of the International Searching Authority; Application No. PCT/US2013/043950; dated Nov. 5, 2013; 3 pages.
Chinese Office Action; Application No. 201380039988.6; dated May 23, 2016; 15 pages.

* cited by examiner (Prior art)

COLLIMATION AND HOMOGENIZATION SYSTEM FOR AN LED LUMINAIRE

RELATED APPLICATION

This application claims priority of U.S. provisional application with the same title Ser. No. 61/654,929 filed on 3 Jun. 2012.

TECHNICAL FIELD OF THE INVENTION

The present invention generally relates to a method for controlling the light output from an array of LEDs when used in a light beam producing luminaire, specifically to a method relating to improving the homogenization and collimation of the LEDs and for controlling the beam angle of the array.

BACKGROUND OF THE INVENTION

Luminaires with automated and remotely controllable functionality are well known in the entertainment and architectural lighting markets. Such products are commonly used in theatres, television studios, concerts, theme parks, night clubs and other venues. A typical product will typically provide control over the pan and tilt functions of the luminaire allowing the operator to control the direction the luminaire is pointing and thus the position of the light beam on the stage or in the studio. This position control is often done via control of the luminaire's position in two orthogonal rotational axes usually referred to as pan and tilt. Many products provide control over other parameters such as the intensity, color, focus, beam size, beam shape and beam pattern. Additionally it is becoming common to utilize high power LEDs as the light source in such luminaires and, for color control, it is common to use an array of LEDs of different colors. For example a common configuration is to use a mix of Red, Green and Blue LEDs. This configuration allows the user to create the color they desire by mixing appropriate levels of the three colors. For example illuminating the Red and Green LEDs while leaving the Blue extinguished will result in an output that appears Yellow. Similarly Red and Blue will result in Magenta and Blue and Green will result in Cyan. By judicious control of the LED controls the user may achieve any color they desire within the color gamut set by the LED colors in the array. More than three colors may also be used and it is well known to add an Amber or White LED to the Red, Green and Blue to enhance the color mixing and improve the gamut of colors available. The products manufactured by Robe Show Lighting such as the Robin 600 LEDWash are typical of the art.

The differently colored LED dies may be arranged on packages in the luminaire such that there is physical separation between each color of LED, and this separation, coupled with differences in die size for each color, may affect the spread of the individual colors and results in inadequate mixing of the different colors along with objectionable spill light and color fringing of the combined mixed color output beam. It is common to use a lens or other optical device in front of each LED package to control the beam shape and angle of the output beam; however these optical devices may have differing effect for different colors and color fringing or other aberrations may be visible in the output beam. It would be advantageous to have a system where stray light and aberrations are well controlled.

Figure 1:
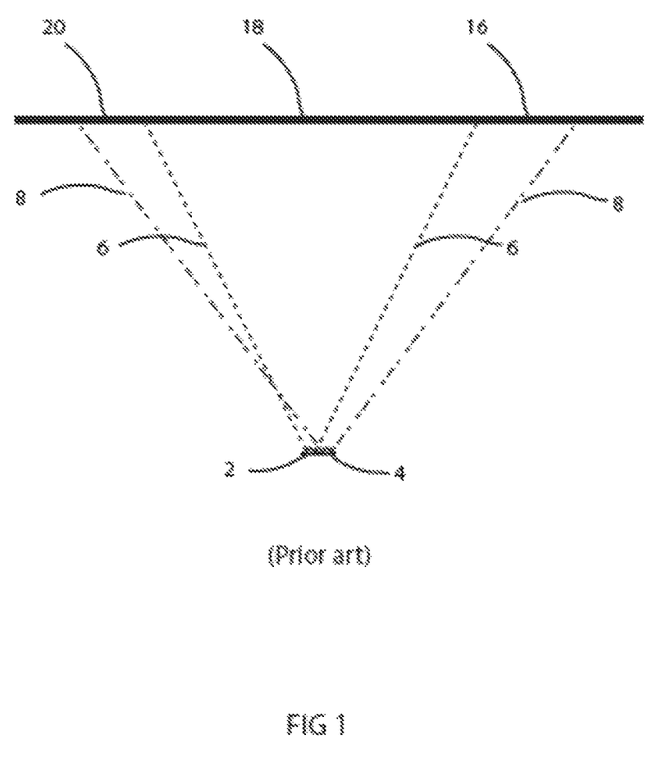
FIG. 1 illustrates a prior art LED lighting system.

FIG. 1 illustrates a prior art system showing two LEDs in a package as may be used in a luminaire. LED 2 and LED 4 may be of differing colors and, due to the different optical properties and construction of the LED dies 2, 4 produce light beams 6 and 8 that differ in beam spread. The differing beam spreads mean that the light beams from LEDs 2 and 4 will impinge on an illuminated object 18 in such a way that areas 20 and 16 of the object are illuminated by a single LED only rather than the desired mix of both. This results in areas 20 and 16 being colored differently from the central mixed area and appearing as colored fringes. Only Two (2) LEDs are illustrated in FIG. 1 for clarity and simplicity. It should be appreciated that the same problem exists with systems incorporating more than two colors of LED.

Figure 2:
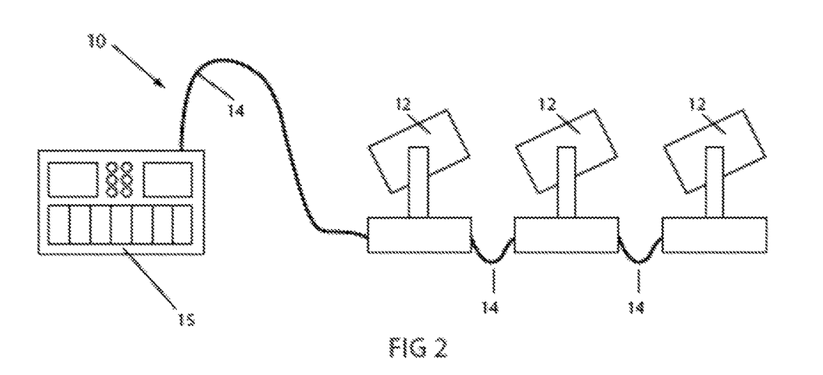
FIG. 2 illustrates a typical automated lighting system.

FIG. 2 illustrates a typical multiparameter automated LED luminaire system 10. These systems commonly include a plurality of multiparameter automated luminaires 12 which typically each contain on-board an array of LEDs, and electric motors coupled to mechanical drives systems and control electronics (not shown). In addition to being connected to mains power, either directly or through a power distribution system (not shown), each luminaire is connected in series or in parallel to data link 14 to one or more control desk(s) 15. The luminaire system 10 is typically controlled by an operator through the control desk 15. Consequently, to effect this control, both the control desk 10 and the individual luminaires typically include electronic circuitry as part of the electromechanical control system for controlling the automated lighting parameters.

Figure 3:
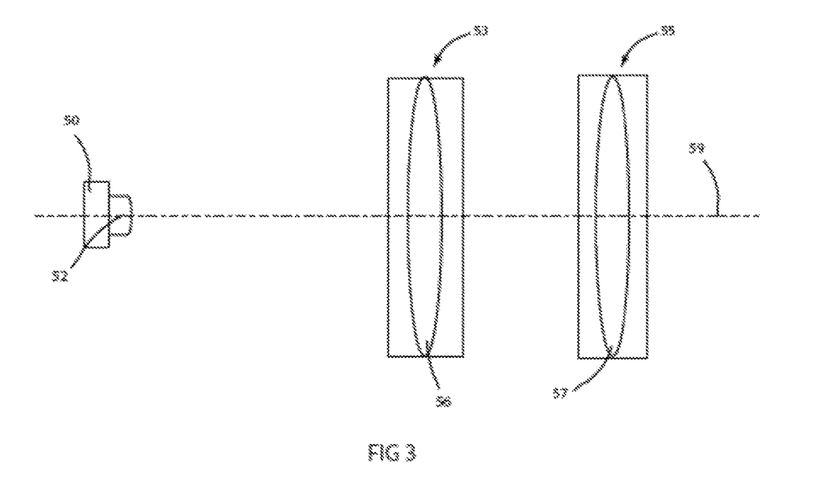
FIG. 3 illustrates optical components of a prior art LED luminaire.
Figure 4:
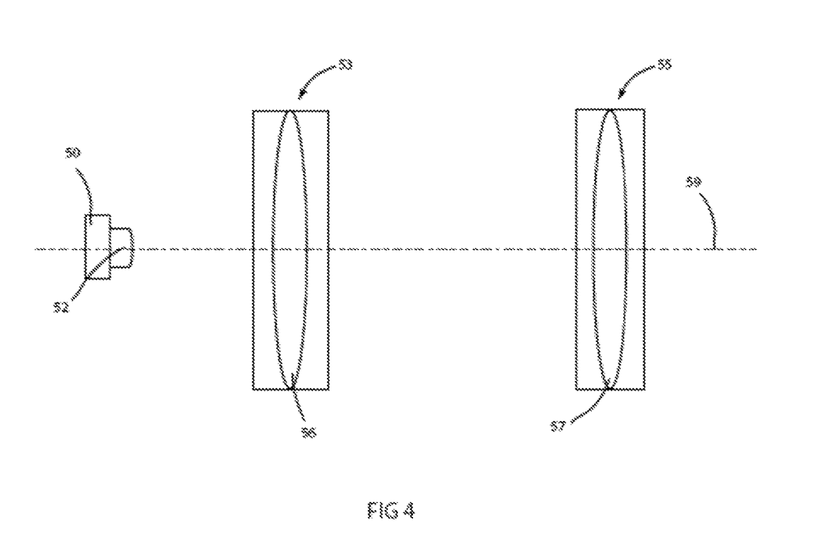
FIG. 4 illustrates optical components of a prior art LED luminaire.

FIG. 3 and FIG. 4 illustrate an optical system used in the prior art to provide a variable beam angle or zoom to an automated LED luminaire. Each LED 50 which may be fitted with a primary optic 52 has an associated pair of lenses 53 and 55. Lenses 53 and 55 may be separate lenses or each part of an array of lenses covering the entire LED array. Lenses 53 and 55 may each comprise a single optical element 56 and 57 respectively. In operation at least one of lens 53 or lens 55 is stationary with respect to LED 50 while the other may move along optical axis 59. In the example illustrated in FIGS. 3 and 4 lens 55 is fixed relative to LED 50 while lens 53 is able to move along optical axis 59. FIG. 3 shows lens 53 in a first position and FIG. 4 shows lens 53 in a second position closer to LED 50. This varying relative position between LED 50, lens 53 and lens 55 provides a beam angle or zoom to the light beam from LED 50. Such systems are often limited in their zoom range by optical problems caused by the color separation and inadequate beam homogenization. They may further be limited by requiring large movements of the lenses.

This is a need for an optical system for an LED automated luminaire which provides improved color homogenization and beam collimation while also providing improved zoom range.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention generally relates to a method for controlling the light output from an array of LEDs when used in a light beam producing luminaire, specifically to a method relating to improving the homogenization and collimation of the LEDs and for controlling the beam angle of the array.

Figure 5:
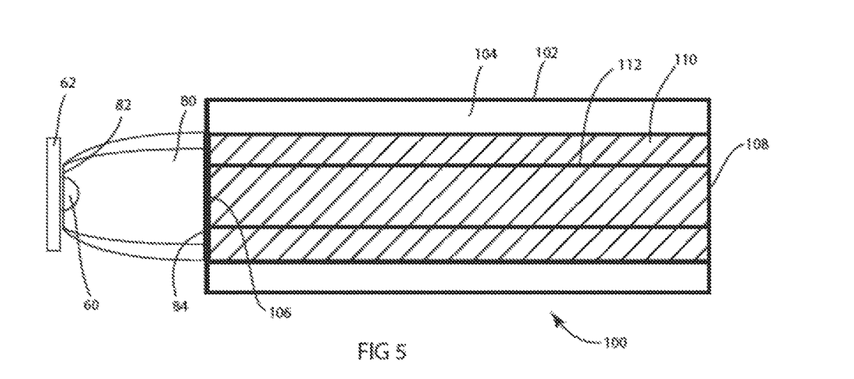
FIG. 5 illustrates optical components of an embodiment of the LED luminaire.

FIG. 5 illustrates an embodiment of the optical system of the invention. LED 60, which may include a primary optic, is mounted on substrate 62. LED 60 may contain a single color die or may contain multiple dies, each of which may be of differing colors. The light output from the dies in LED 60 enters collimating and mixing optic 80 at light entry port 82. Collimating and mixing optic 80 may be a solid optic using total internal reflection (TIR) to direct the light or may be a hollow reflective surface. Collimating and mixing optic 80 may have four sides 86, each of which may be curved with cornered sides 92. The end view of collimating and mixing optic 80 in FIG. 6 combined with side illustration of the collimating and mixing optic 80 in FIG. 5 illustrate details an embodiment of the shape. The combination square sided shape with curved sides provides excellent mixing of the light from the dies 64 in LED 60. A further feature of collimating and mixing optic 64 is that it directs the reflected light to an external focal point which is comparatively close to its output port 84 of the collimating and mixing optic 80.

Figure 6:
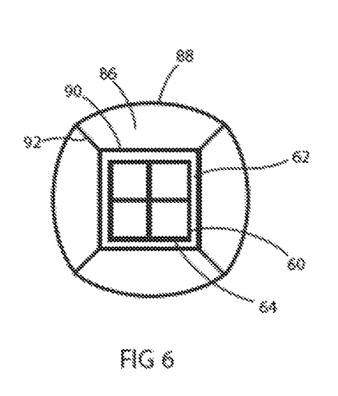
FIG. 6 illustrates a front view of the collimating and mixing optic 80 and LED 60 of FIG. 5.
Figure 10:
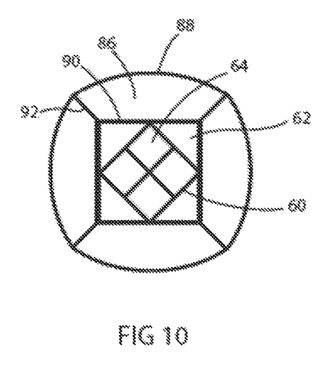
FIG. 10 illustrates a front view of the collimating and mixing optic 80 and LED 60 of FIG. 5.
Figure 11:
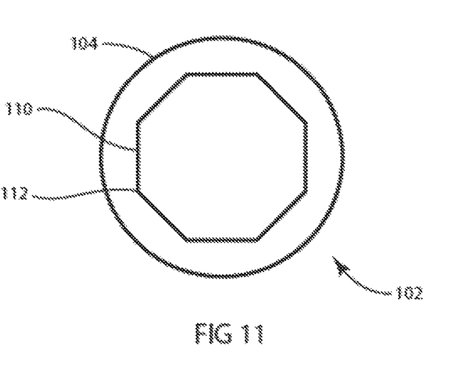
FIG. 11 illustrates a front view of the light integrator 102 of FIG. 5.

In the embodiments illustrated in FIG. 6 the configuration of the plurality of LED dies 64 in LED 60 is square and aligned with the sides 86 of the collimator 80. In other embodiments the alignment of the dies with the collimator sides may not be aligned, for example as illustrated in FIG. 10. In alternative embodiments to those illustrated in FIG. 6 and FIG. 10, the collimator may have a plurality of slides of three, four, or more sides. In further embodiments the arrangement of the dies in the LED array may be configured in different shapes and paired with collimators with matching or divergent shapes.

In different embodiments degree of curvature of the sides 86 may vary—flatter for some configurations and more curved for other configurations. Additionally, the sharpness of the corners 92 between the sides may vary among different collimators—sharper for some configurations and rounder for others. The selection of the number of sides and the curvature of the sides and curvature of the corners is/are tradeoffs between the degree of mixing desired and acceptable light loss for a particular configuration or application.

Figure 7:
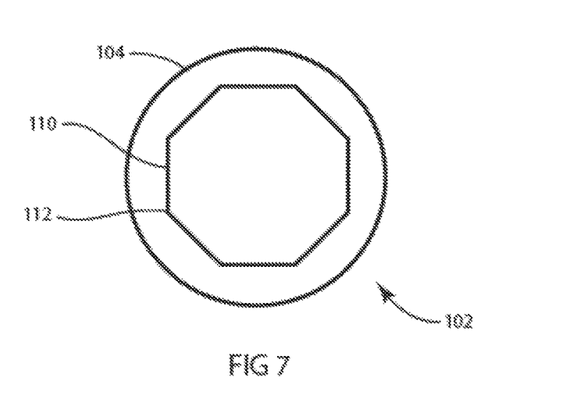
FIG. 7 illustrates a front view of the light integrator 102 of FIG. 5.

In the embodiment shown in FIG. 5, the reflected light exits collimating and mixing optic 80 at port 84 and enters light integrator optic 102 at its entry port 106. Light integrator 102 is a device utilizing internal reflection so as to collect, homogenize and constrain and conduct the light from collimating and mixing optic 80. Light integrator 102 may be a hollow tube with a reflective inner surface such that light impinging into the entry port may be reflected multiple times along the tube before leaving at the exit port 108. Light integrator 102 may be a square tube, a hexagonal tube, a heptagonal tube, an octagonal tube, a circular tube, or a tube of any other cross section. In a further embodiment light integrator 102 may be a solid rod constructed of glass, transparent plastic or other optically transparent material where the reflection of the incident light beam within the rod is due to total internal reflection (TIR) from the interface between the material of the rod and the surrounding air. The integrating rod may be a square rod, a hexagonal rod, a heptagonal rod, an octagonal rod, a circular rod, or a rod of any other cross section. Integrator embodiments with a polygonal cross section have reflective sides 110 and corners 112 between the reflective sides as seen in FIG. 5 which includes a side cross sectional view of the integrator 102 and more easily seen in FIG. 7 a front exit port view of the integrator 102.

A feature of a light integrator 102 which comprises a hollow or tube or solid rod where the sides of the rod or tube are essentially parallel and the entrance aperture 106 and exit aperture 108 are of the same size is that the divergence angle of light exiting the integrator 102 at exit port 108 will be the same as the divergence angle for light entering the integrator 102 at entry port 106. Thus a parallel sided integrator 102 has no effect on the beam divergence and will transfer the position of the focal point of collimating and mixing optic 80 at its exit aperture 84 to the exit aperture 108 of the integrator 102. The light exiting integrator 102 will be well homogenized with all the colors of LED 60 mixed together into a single colored light beam and may be used as an output, or may be further modified by downstream optical systems.

Integrator 102 may advantageously have an aspect ratio where its length is much greater than its diameter. The greater the ratio between length and diameter, the better the resultant mixing and homogenization will be. Integrator 102 may be enclosed in a tube or sleeve 104 which provides mechanical protection against damage, scratches, and dust.

Figure 8:
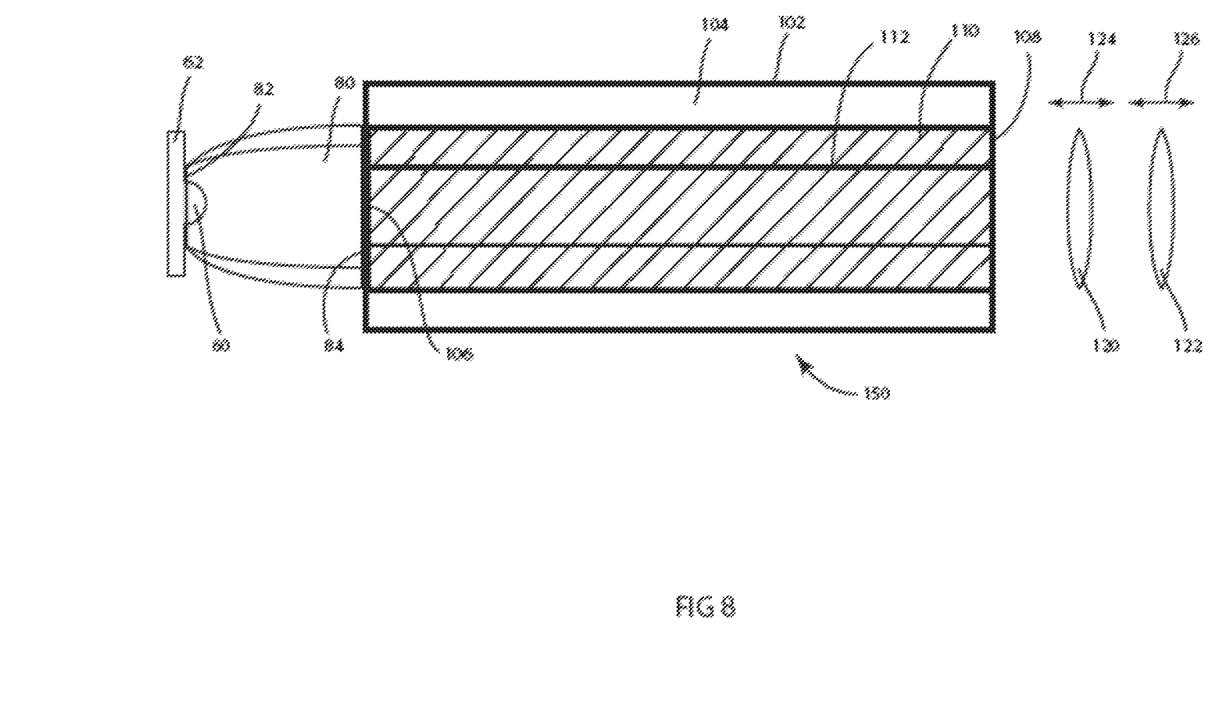
FIG. 8 illustrates a further embodiment of the embodiment illustrated in FIG. 5.

FIG. 8 illustrates a further embodiment of the invention. Elements LED 60, substrate 62, collimating and mixing optic 80, integrator 102, are as described above for FIG. 5, FIG. 6 and FIG. 7. In this embodiment the homogenized and focused light exiting from integrator 102 is directed through lens system 120 and 122. Lenses 120 and 122 may be independently movable 124 and 126 along the optical axis so as to provide beam angle control over the light beam. Because the focal point of collimating and mixing optic 80 is short, a small motion of lenses 120 and 122 may cause a large change in beam angle. In one embodiment movements 124 and 126 of 10 mm in the position of lenses 120 and/or 122 may cause a change in beam angle from 5° to 50°. Thus providing an improved variable beam angle or zoom to an automated LED luminaire.

In further embodiments, lenses 120 and 122 may form an achromatic optical system such that it provides the same degree of beam angle change to long wavelength red light as it does to short wavelength blue light and thus avoids chromatic aberration. This ensures that the beams from the different colors of LED dies 64 in LED 60 are all the same size resulting in a uniformly colored combined beam. In yet further embodiments any number of lenses may be used as the lens system. In all cases, lenses may contain one or more optical elements. Lenses 120 and 122 are illustrated herein as bi-convex lenses however the invention is not so limited and lenses 120 and 122 may be any shaped optical element as well known in the art.

Figure 9:
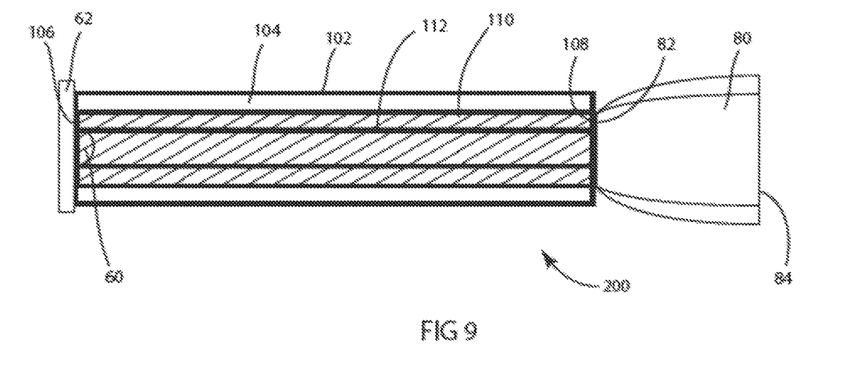
FIG. 9 illustrates an alternative embodiment of the LED luminaire.

FIG. 9 illustrates an embodiment of the optical system of the invention. LED 60, which may include a primary optic, is mounted on substrate 62. LED 60 may contain a single color die 64 or may contain multiple dies 64, each of which may be of differing colors. The light output from the dies 64 in LED 60 enters light integrator optic 102 at entry port 106. Light integrator 102 may be of the same construction and configuration as in the embodiment illustrated in FIG. 5. Light integrator 102 is a device utilizing internal reflection so as to collect, homogenize and constrain and conduct the light to the entry port 82 of collimating and mixing optic 80. Light integrator 102 may be a hollow tube with a reflective inner surface such that light impinging into the entry port 106 may be reflected multiple times along the tube before leaving at the exit port 108. Light integrator 102 may be a square tube, a hexagonal tube, a heptagonal tube, an octagonal tube, a circular tube, or a tube of any other cross section. In a further embodiment light integrator 102 may be a solid rod constructed of glass, transparent plastic or other optically transparent material where the reflection of the incident light beam within the rod is due to total internal reflection (TIR) from the interface between the material of the rod and the surrounding air. The integrating rod may a square rod, a hexagonal rod, a heptagonal rod, an octagonal rod, a circular rod, or a rod of any other cross section.

A feature of a light integrator 102 which comprises a hollow or tube or solid rod where the sides of the rod or tube are essentially parallel and the entrance aperture 106 and exit aperture 108 are of the same size is that the divergence angle of light exiting the integrator 102 exit port 108 will be the same as the divergence angle for light entering the integrator 102 at entry port 106 from LED 60. Thus a parallel sided integrator 102 has no effect on the beam divergence and will transfer the light from LED 60 to its exit aperture 108. The light exiting integrator 102 will be well homogenized with all the colors of LED 60 mixed together into a single colored light beam.

Integrator 102 may advantageously have an aspect ratio where its length is much greater than its diameter. The greater the ratio between length and diameter, the better the resultant mixing and homogenization will be. Integrator 102 may be enclosed in a tube or sleeve 104 which provides mechanical protection against damage, scratches, and dust.

Light exiting integrator 102 at exit port 108 enters collimating and mixing optic 80 at its entry port 82. Collimating and mixing optic 80 may be of the same construction and configuration as the collimating and mixing optic in embodiment illustrated in FIG. 5. Collimating and mixing optic 80 may be a solid optic using total internal reflection (TIR) to direct the light or may be a hollow reflective surface. Collimating and mixing optic 80 may have four sides, each of which may be curved. The side view of collimating and mixing optic 80 included in FIG. 9 and the end view of collimating and mixing optic 80 in FIG. 10 illustrate the detail of this shape. The combination square sided shape with curved sides provides further mixing of the light from the dies in LED 60 as homogenized by integrator 102. A further feature of collimating and mixing optic 80 is that it directs the reflected light to an external focal point which is comparatively close to its output face.

In the embodiment shown in FIG. 9 the reflected light exits collimating and mixing optic 80 at exit port 84 and may be used as an output, or may be further modified by downstream optical systems.

Figure 12:
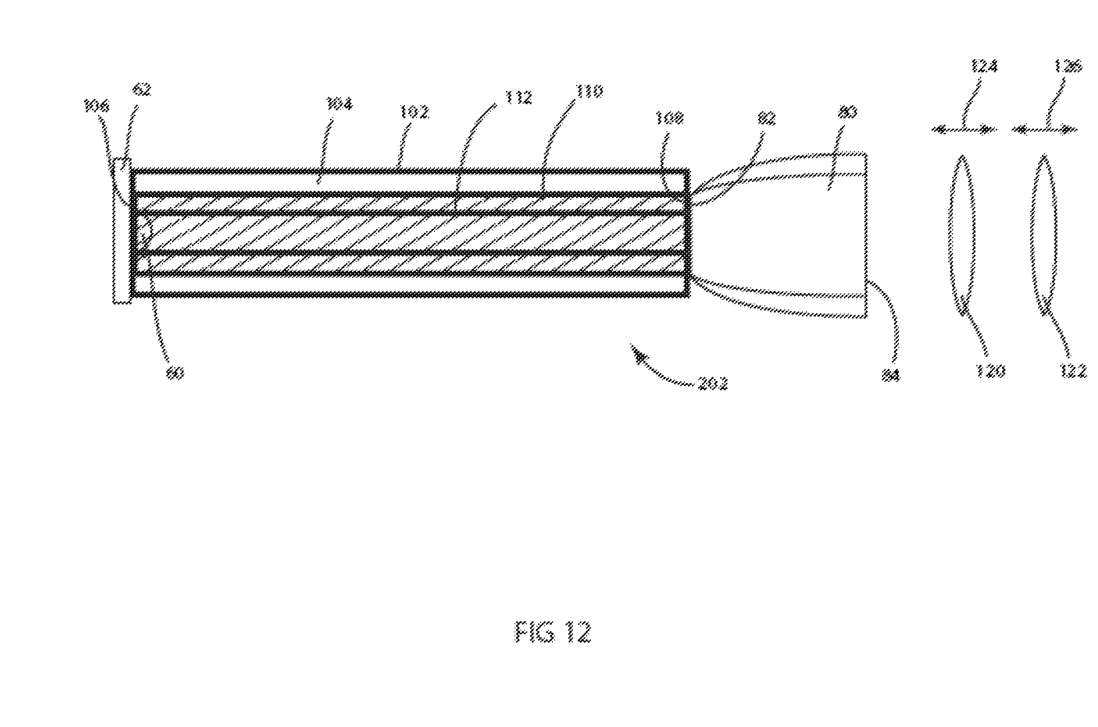
FIG. 12 illustrates a further embodiment of the embodiment illustrated in FIG. 5.

Figure 12 illustrates a further embodiment of the invention. Elements LED 60, substrate 62, collimating and mixing optic 80, and integrator 102, can be as described above. In this embodiment the homogenized and focused light exiting from collimating and mixing optic 80 is directed through lens system 120 and 122. Lenses 120 and 122 may be independently movable along the optical axis so as to provide beam angle control over the exiting light beam. Because the focal point of collimating and mixing optic 80 is short, a small motion of lenses 120 and 122 may cause a large change in beam angle. In one embodiment,. a movement of 10 mm in the position of lenses 120 and/or 122 may cause a change in beam angle from 5° to 50°. Thus providing an improved variable beam angle or zoom to an automated LED luminaire.

Figure 13:
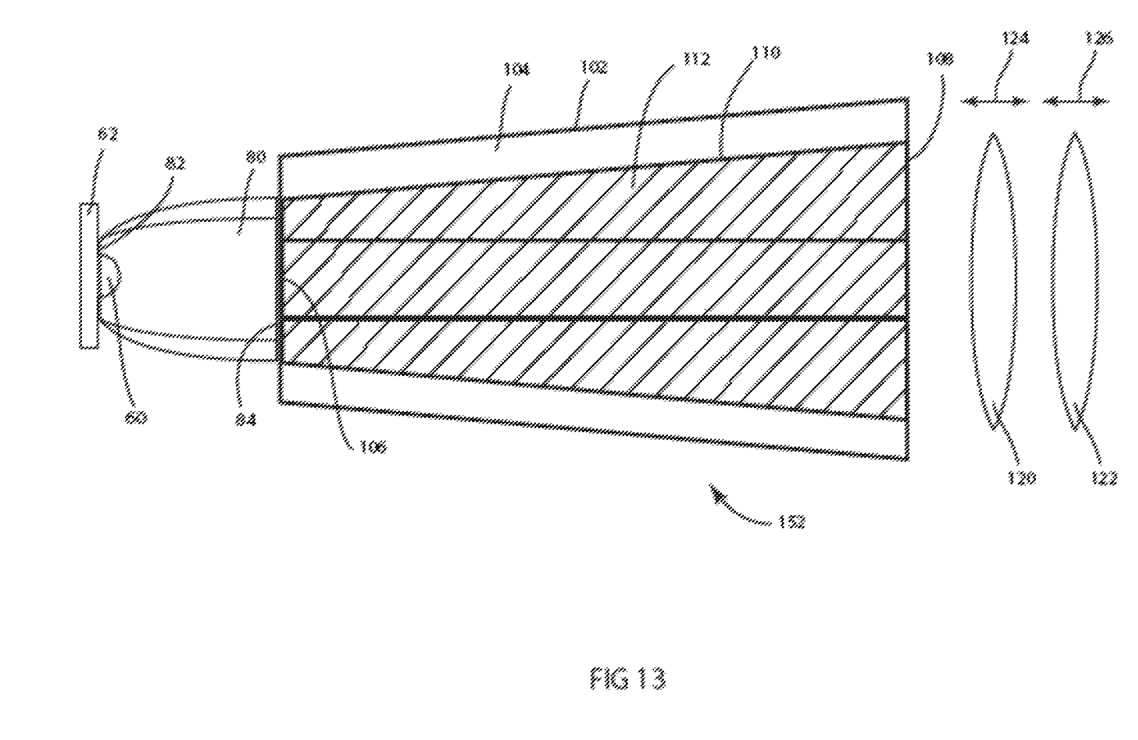
FIG. 13 illustrates an alternative embodiment of the LED luminaire illustrated in FIG. 5.
Figure 14:
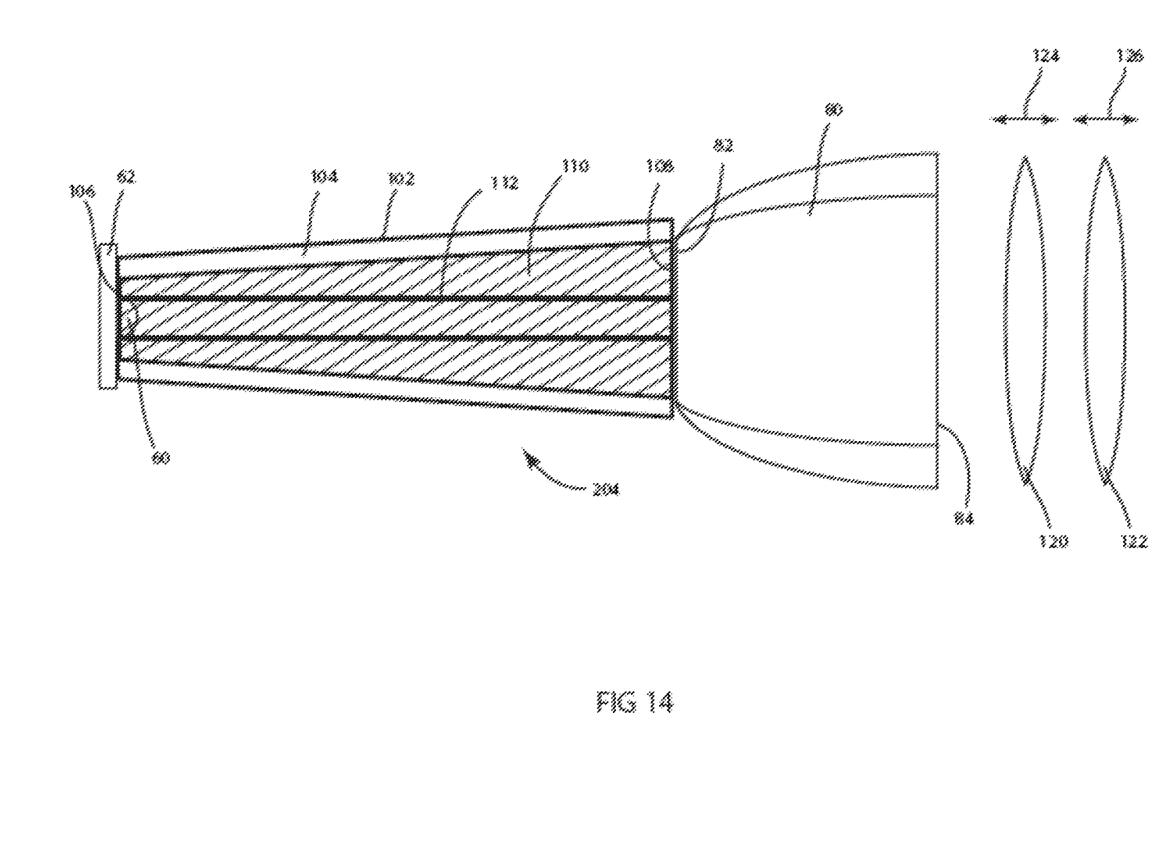
FIG. 14 illustrates an alternative embodiment of the LED luminaire illustrated in FIG. 9.

In further embodiments, lenses 120 and 122 may form an achromatic optical system such that it provides the same degree of beam angle change to long wavelength red light as it does to short wavelength blue light and thus avoids chromatic aberration. This ensures that the beams from the different colors of LED dies in LED 60 are all the same size resulting in a uniformly colored combined beam. In yet further embodiments any number of lenses may be used as the lens system. In all cases, lenses may contain one or more optical elements. Lenses 120 and 122 are illustrated herein as bi-convex lenses however the invention is not so limited and lenses 120 and 122 may be any shaped optical element as well known in the art and may include any number of lenses including a single lens. This applies to any of the embodiments discussed above FIG. 13 and FIG. 14 illustrate further alternative embodiments of LED luminaires. In both of these embodiments the light integrator 102, whether solid or hollow, has sides 110 which are tapered so that entrance aperture 106 is smaller than the exit aperture 108. The advantage of this structure is that the divergence angle of light exiting the integrator 102 at exit port 108 will be smaller than the divergence angle for light entering the integrator 102 at entry port 106. The combination of a smaller divergence angle from a larger aperture serves to conserve the etendue of the system. Thus a tapered integrator 102 may provide similar functionality to a condensing optical system. Therefore some embodiments may not include optical elements 120 122 as discussed above while other embodiments may include such elements as discussed above with regard to embodiments with non-tapered integrators.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. An LED luminaire comprising:
   one or more light-emitting diodes (LEDs) emitting light of a plurality of discrete colors; and a single element light collimator optically coupled to the one or more LEDs, the collimator comprising:
  a light receiving end with a general geometric shape that is the same as the general shape of the cross sectional shape of the LED(s) with straight edges, which transitions into a geometric shape with curved edges rotationally displaced from the cross-sectional shape orientation of the LED die; and
  a plurality of at least three sides curved in a cross-section perpendicular to the primary axis of the collimated and mixed light exiting the collimator.

2. The luminaire of claim 1, wherein a light receiving end of the collimator has a geometric shape with straight edges which transitions into a geometric shape with curved edges.

3. The luminaire of claim 1, wherein a light exiting end of the collimator has said geometric shape with curved edges.

4. The luminaire of claim 1, wherein the geometric shape of the light receiving end of the collimator is the same general cross-sectional shape as the shape of the LED(s).

5. The luminaire of claim 4 wherein the geometric shape of the receiving end of the collimator is aligned with the cross-sectional shape orientation of the LED die.

6. The luminaire of claim 1, wherein the collimator accepts light from the LED(s) and an elongated light integrator receives light from the collimator.

7. The luminaire of claim 1, wherein an elongated light integrator receives light from the LED(s) and the collimator receives light from the elongated light integrator.

8. The luminaire of claim 1, wherein the light exiting an elongated light integrator is received in order by a plurality of independently articulatable optical lenses.

9. The luminaire of claim 1 wherein a light receiving end of an elongated light integrator has a smaller cross section than a light exiting end of the elongated light integrator.

10. An LED luminaire comprising:
  one or more light-emitting diodes (LEDs) emitting light of a plurality of discrete colors, the one or more LEDs having a first plurality of edges; and
  a single element light collimator optically coupled to the one or more LEDs, the collimator having a light receiving end with a second plurality of edges and a plurality of at least three sides curved in a cross-section perpendicular to the primary axis of the collimated and mixed light exiting the collimator,
  wherein at least one of the first plurality of edges forms an acute angle with at least one adjacent edge of the second plurality of edges, and wherein a geometric shape of the receiving end of the collimator is aligned with a cross-sectional shape orientation of the LED die.

11. The luminaire of claim 10, wherein the light receiving end of the collimator has a geometric shape with straight edges which transitions into a geometric shape with curved edges.

12. The luminaire of claim 10, wherein a light exiting end of the collimator has a geometric shape with curved edges.

13. The luminaire of claim 10, wherein the geometric shape of the receiving end of the collimator is aligned with the cross-sectional shape orientation of the LED die.

14. The luminaire of claim 10, wherein the collimator accepts light from the LED(s) and an elongated light integrator receives light from the collimator.

15. The luminaire of claim 10, wherein an elongated light integrator receives light from the LED(s) and the collimator receives light from the elongated light integrator.

16. The luminaire of claim 10, wherein the light exiting an elongated light integrator is received in order by a plurality of independently articulatable optical lenses.

17. The luminaire of claim 10, wherein a light receiving end of an elongated light integrator has a smaller cross section than a light exiting end of the elongated light integrator.

* * * * *